E. A. REICHELT.
FOUR-WHEEL DRIVE FOR MOTOR VEHICLES.
APPLICATION FILED NOV. 12, 1917.
1,268,279.
Patented June 4, 1918.
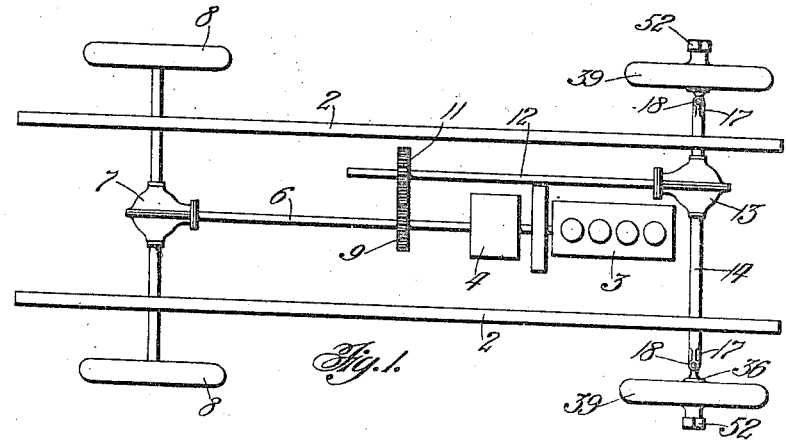
*Fig. 1.*
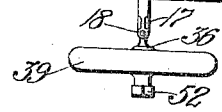
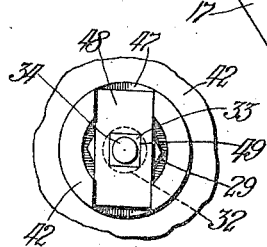
*Fig. 3.*
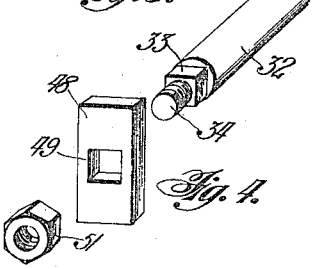
*Fig. 4.*
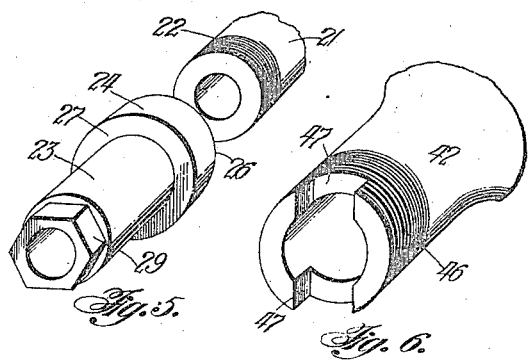
*Fig. 5.* *Fig. 6.*
Inventor:
Ernest Albert Reichelt
By
Attorney

UNITED STATES PATENT OFFICE.

ERNEST A. REICHELT, OF LORQUON, VICTORIA, AUSTRALIA.

FOUR-WHEEL DRIVE FOR MOTOR-VEHICLES.

1,268,279.   Specification of Letters Patent.   Patented June 4, 1918.

Application filed November 12, 1917. Serial No. 201,507.

*To all whom it may concern:*

Be it known that I, ERNEST ALBERT REICHELT, a subject of the King of Great Britain and Ireland, and a resident of the post-town of Lorquon, in the parish of Lorquon, county of Lowan, State of Victoria, Commonwealth of Australia, (whose post-office address is in the said post-town of Lorquon,) have invented a certain new and useful Improved Four-Wheel Drive for Motor-Vehicles, of which the following is a specification.

This invention relates to motor vehicles of the type in which power is transmitted to all four of the road wheels whereby a greater tractive effort is developed and other advantages such as the prevention of skidding and more equal power distribution are obtained.

The object of the invention is to provide a simple and efficient drive and an improved construction of the parts comprising the front wheel mountings whereby said wheels may be both driven and steered. With these objects in view the invention consists in the construction and arrangement of parts which will hereinafter be fully described.

Referring to the drawings which form a part of this specification:—

Figure 1 is a diagrammatic plan view showing the general arrangement of my improved four wheel drive.

Fig. 2 is a sectional view on a larger scale showing the method of mounting the front driving and steering wheels.

Fig. 3 is a detail view looking at the outer end of the hub seen in Fig. 2, a cap and the retaining nut being removed for convenience of illustration.

Fig. 4 is a perspective view of the outer end of a front live axle extension showing also a rectangular driving plate and its retaining nut.

Fig. 5 is a perspective view of a stationary bush and the end of a sleeve to which it is attached.

Fig. 6 is a perspective view of a portion of an outer hub member showing clearly the rectangular slotway or recess which accommodates the rectangular driving plate by which the front wheels are caused to rotate.

Referring to the drawings 2 indicates the chassis, 3 the engine, and 4 the gear case from which the ordinary propeller shaft 6 drives directly to the back axle differential 7 which operates the rear wheels 8.

Mounted on the propeller shaft 6 is a driving wheel 9 which gears with a driven wheel 11 mounted upon a counter-shaft 12. This counter-shaft extends forwardly to a front axle differential 13, mounted on a stationary front axle 14. Through this stationary front axle passes a live front axle 16, which is operated by the front differential 13.

Carried by each end of the stationary front axle is the inner member 17 of a steering knuckle. Connected to each of the members 17 by vertical swivel pins 18 is the outer member 19 of the steering knuckle. Each said outer member is provided with an extended sleeve 21 having a threaded outer end 22. Threaded onto the said sleeve is a stationary cylindrical bush 23. This has an enlarged inner end 24 forming an inner external shoulder 26, an outer external shoulder 27 and an internal shoulder 28. The threaded interior of the said enlarged end engages the external thread of the sleeve 21, the outer end of which abuts against the internal shoulder 28 of the bush. The outer end of the said bush is provided with flats 29 or holes or the like to accommodate a suitable turning tool by which the bush may be attached and removed.

Connected to each end of the live front axle 16 by a suitable universal joint 31 is a live front axle extension 32. This extends through the sleeve and the bush before mentioned and is provided near its outer end with a square or flattened driving portion 33 beyond which is a threaded end 34.

Rotatably mounted upon the sleeve 21 is an inner hub member 36 having an annular recess 37 to accommodate the shoulder 26 of the bush. The said inner hub member 36 has fixed to it by bolts 38 or other suitable means a front driving and steering wheel 39, and to the latter there is secured in turn by nuts 41 engaging the bolts 38, an outer hub member 42, provided with an annular recess 43 which accommodates the outer shoulder 27 of the stationary bush. The outer end of the outer hub member is externally threaded as at 46 and is provided with a rectangular slotway or recess 47 which extends transversely across the end of the said hub member.

Accommodated by the said slotway or recess is a rectangular driving plate 48 having through its center a square hole 49 to accommodate the square driving portion 33 of the live axle extension 32. The driving plate 48 is held in position by a retaining nut 51 which engages the threaded end 34 of the live axle extension.

An internally threaded cap 52 engages the external thread 46 of the outer hub member and excludes dust and other foreign matter. Suitable anti-friction devices may be, if desired, included where necessary.

The drive from the engine is a follows:— The propeller shaft 6 drives the back axle through the back axle differential 7 in the ordinary manner and it will be seen that this part of the construction necessitates no departure from ordinary practice and thus affords an advantage in the cost of production. The counter-shaft 12 is driven from the propeller shaft by the gears 9 and 11 and transmits its motion through the front differential 13 to the live front axle 16 which in turn rotates the extensions 32. The latter by reason of the universal joint and steering knuckle are permitted to move freely about a vertical axis for steering purposes. By the rotation of the extensions 32 the squared driving portions 33 thereon cause the rectangular driving plates 48 to engage the sides of the slotways 47 and turn the front wheels which revolve upon the bearings provided by the sleeve 21 and bush 23.

Having now described my invention what I claim as new and desire to secure by Letters Patent is:—

In a device of the character described, the combination of a sleeve having an externally-threaded outer end; a bush disposed in endwise axial alinement with said sleeve and having an internally-threaded, enlarged inner end in which the threaded outer end of said sleeve is engaged; an outer hub member surrounding said bush; an inner hub member surrounding said sleeve, said hub members adapted to receive a wheel between them and having annular recesses to accommodate the enlarged end of the bush; and a member extending through said sleeve and bush and connected to positively drive the outer hub member.

In testimony whereof I affix my signature.

E. A. REICHELT.

Copies of this patent may be obtained for five cents each, by addressing the "Commissioner of Patents, Washington, D. C."